(12) United States Patent
Wang et al.

(10) Patent No.: US 10,947,842 B2
(45) Date of Patent: Mar. 16, 2021

(54) MEASUREMENT-WHILE-DRILLING METHOD AND DEVICE FOR ASSESSING OUTBURST RISK OF COAL SEAM

(71) Applicant: CHINA UNIVERSITY OF MINING AND TECHNOLOGY, Jiangsu (CN)

(72) Inventors: Enyuan Wang, Jiangsu (CN); Zhonghui Li, Jiangsu (CN); Jianchun Ou, Jiangsu (CN); Liming Qiu, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 0 days.

(21) Appl. No.: 16/615,013

(22) PCT Filed: Nov. 27, 2017

(86) PCT No.: PCT/CN2017/113132
§ 371 (c)(1),
(2) Date: Nov. 19, 2019

(87) PCT Pub. No.: WO2019/071755
PCT Pub. Date: Apr. 18, 2019

(65) Prior Publication Data
US 2020/0200004 A1    Jun. 25, 2020

(30) Foreign Application Priority Data
Oct. 12, 2017 (CN) .......................... 201710945322.7

(51) Int. Cl.
*E21B 49/00*  (2006.01)
*E21B 47/07*  (2012.01)
(Continued)

(52) U.S. Cl.
CPC ............ *E21B 49/00* (2013.01); *E21B 47/024* (2013.01); *E21B 47/06* (2013.01); *E21B 47/07* (2020.05);
(Continued)

(58) Field of Classification Search
CPC .......... E21B 49/08; E21B 47/00; E21B 47/06; E21B 47/14; E21B 47/02; E21B 47/024; E21B 47/01; E21B 33/127
See application file for complete search history.

(56) References Cited

U.S. PATENT DOCUMENTS 6,490,527 B1 * 12/2002 Utt ........................... G01V 9/00
702/9

FOREIGN PATENT DOCUMENTS

| CN | 101581217 A | 11/2009 |
| CN | 102230375 A | 11/2011 |

(Continued)

OTHER PUBLICATIONS

International Search Report for corresponding PCT application No. PCT/CN2017/113132, dated Jul. 13, 2018.

*Primary Examiner* — Tara Schimpf
*Assistant Examiner* — Manuel C Portocarrero
(74) *Attorney, Agent, or Firm* — Notaro, Michalos & Zaccaria P.C.

(57) ABSTRACT

A measurement-while-drilling method and device assesses outburst risk and evaluates gas drainage performance of a coal seam. The device includes a compartment, a pressure sensor, a temperature sensor, a flow sensor, an electromagnetic sensor, an acoustic sensor, a wave velocity measurement module, a monitoring and control module, a power supply and a communication interface. These are installed between a drill bit and an inclinometer or a first drill pipe. Measurements are performed while drilling to obtain a real (Continued)

time gas parameter, lithologic and coal seam information, for on-site assessment of outburst risk. During drill bit replacement, gas pressure, temperature, flow velocity, wave velocity, electromagnetic radiation, and an acoustic signal are recorded in real time, to calculate stress of the coal seam and coal seam outburst risk. On-site measurement is done while drilling without sampling and can use multiple parameters to perform synchronous measurement to obtain a comprehensive evaluation.

5 Claims, 1 Drawing Sheet

(51) Int. Cl.
| | | |
|---|---|---|
| *E21B 47/024* | (2006.01) | |
| *E21B 47/06* | (2012.01) | |
| *E21B 47/10* | (2012.01) | |
| *E21B 47/14* | (2006.01) | |
| *E21B 49/08* | (2006.01) | |
| *G01V 1/46* | (2006.01) | |
| *G01V 1/52* | (2006.01) | |
| *E21B 7/00* | (2006.01) | |
| *E21B 33/124* | (2006.01) | |
| *E21B 33/127* | (2006.01) | |
| *G01V 3/38* | (2006.01) | |
| *G01V 3/26* | (2006.01) | |
| *G01V 1/50* | (2006.01) | |
| *G01V 11/00* | (2006.01) | |
| *E21B 47/02* | (2006.01) | |
| *E21B 47/00* | (2012.01) | |

(52) U.S. Cl.
CPC .............. *E21B 47/10* (2013.01); *E21B 47/14* (2013.01); *E21B 49/08* (2013.01); *G01V 1/46* (2013.01); *G01V 1/52* (2013.01); *E21B 7/00* (2013.01); *E21B 33/127* (2013.01); *E21B 33/1243* (2013.01); *E21B 47/00* (2013.01); *E21B 47/02* (2013.01); *G01V 1/50* (2013.01); *G01V 3/26* (2013.01); *G01V 3/38* (2013.01); *G01V 11/00* (2013.01); *G01V 11/002* (2013.01); *G01V 11/005* (2013.01); *G01V 2001/526* (2013.01); *G01V 2200/16* (2013.01); *G01V 2210/121* (2013.01); *G01V 2210/1299* (2013.01); *G01V 2210/1429* (2013.01); *G01V 2210/6222* (2013.01)

(56) References Cited

FOREIGN PATENT DOCUMENTS

| | | |
|---|---|---|
| CN | 102839964 A | 12/2012 |
| CN | 104695940 A | 6/2015 |
| CN | 105863616 A | 8/2016 |
| CN | 106761931 A | 5/2017 |
| CN | 107476822 A | 12/2017 |
| DE | 10008450 C1 | 9/2001 |
| SU | 898097 A1 | 1/1982 |

\* cited by examiner

MEASUREMENT-WHILE-DRILLING METHOD AND DEVICE FOR ASSESSING OUTBURST RISK OF COAL SEAM

TECHNICAL FIELD

The present invention relates to methods and devices for the measurement of the coal seam outburst risk, in particular to methods and devices for the measurement-while-drilling of the coal seam outburst risk, which belong to the field of coal mining and coal mine safety.

BACKGROUND ART

Deep coal seam mining is confronted with the threat of a high risk of methane, coal and gas outburst (hereinafter referred to as "outburst"). Over 50% of state-owned major coal mines in China are affected by the outburst risk. Moreover, as the mining depth is increased, the ground stress and gas pressure are increased, and the outburst risk becomes more severe and more complex increasingly. The coal seam outburst risk must be tested and analyzed in order to carry out outburst risk identification, regional risk detection, regional risk prediction, mining face outburst risk forecast, and outburst prevention measure effect verification, etc. Presently, coal seam outburst risk identification, detection and regional prediction, regional outburst prevention measure result verification, etc. are mainly carried out by testing and analyzing the major indicators such as gas pressure and gas content in the coal seam, etc. The parameters such as gas content in the coal seam are mainly tested by sampling test, and the gas pressure in the coal seam is obtained mainly with a sealed borehole balance measurement method or through inversed calculation from the gas content in the coal seam. At present, the relatively accurate spot sampling and measurement method for testing the gas content in the coal seam involves a complex sampling process, and the sampling while withdrawing process, sampling time, sampling method, typicality of sampling location, and inversed calculation of initial loss, etc. have great influence on the accuracy of the measurement of the gas content in the coal seam. The quick coal seam gas content testing based on a cuttings method, which is widely used presently, has poorer sampling spot accuracy, poorer sampling time accuracy, and higher test error. The regional outburst prevention measure verification and the mining face (local) outburst risk are mainly judged on the basis of an indicator of gas desorption in the drill cuttings or an indicator of initial gas gushing velocity from the borehole, etc. The borehole indicators such as the indicator of gas desorption in the drill cuttings or the initial gas gushing velocity from the borehole are mainly tested after drill bit withdrawal from a shallow borehole in the mining face. All of those methods have drawbacks such as inadequate measuring points, low accuracy of reflection of the distribution of gas and outburst risk in the coal seam, and are prone to missing maximum value. Besides, the testing parameters employed by those methods are inadequate, and cannot comprehensively reflect the indicators of outburst risk. Various coal seam mechanical property measurement methods also have problems such as inadequate measuring points, long testing time, and complex testing process, etc., and cannot realize measurement while drilling. Therefore, it is unable to test the outburst risk of a coal seam on the spot while drilling.

It is urgent to provide a method and solve the technical problem how to measure the coal seam outburst risk on the spot quickly and efficiently in real time while drilling. Such a method has a high application demand and wide application prospects, and is a great revolution to coal seam outburst risk measurement methods.

CONTENTS OF THE INVENTION

Technical Problem in view of the demand and the technical problems in the prior art, the present invention provides a device and a method for the measurement of the coal seam outburst risk on the spot in real time while drilling, so as to solve the problems that the gas parameter testing points, testing data, and testing indicators are inadequate, the coal seam gas parameters and outburst risk cannot be tested on the spot in real time while drilling, the coal seam outburst risk testing duration is too long, and the testing process is too complex, etc. at present.

Technical Scheme the measurement-while-drilling device for assessing the coal seam outburst risk provided in the present invention mainly comprises a compartment, a pressure sensor, a temperature sensor, a wave velocity measurement module including a vibration source and a vibration pickup, an electromagnetic sensor, an acoustic wave sensor, a borehole sealing module, a flow measurement module, a communication interface, a monitoring and control module, and a power supply compartment that has an electric charging interface and can be removed and mounted quickly, the power supply compartment supplies power to the monitoring and control module and the power utilization modules or sensors connected to the monitoring and control module; the compartment is a rod body that has a variety of sensors and modules fixed thereon, is hollow and has a water flow hole and a threading hole, with two ends connected with a drill bit and a measurement-while-drilling inclinometer and a first drill pipe respectively in a sealed manner; the pressure sensor, the temperature sensor, the flow measurement module, the wave velocity measurement module, the electromagnetic sensor, the acoustic wave sensor, the power supply compartment, and communication interface are connected to corresponding interfaces of the monitoring and control module respectively.

The borehole sealing module comprises two borehole sealing rubber balloons wrapped on the rims of the compartment, a main water circuit switch and a borehole sealing rubber balloon water circuit switch that are mounted on the front end of a hollow water pipe and attain a cut-off effect during borehole sealing; the vibration source of the wave velocity measurement module is mounted on one of the two borehole sealing rubber balloons and emits vibration waves, the vibration pickup is mounted on the other of the borehole sealing rubber balloons and receives vibration waves, the wave velocity in the coal mass at the measuring point can be calculated from the distance and signal time difference between the vibration source and the vibration pickup.

The monitoring and control module comprises a variety of sensors and module interfaces, a data storage unit, a timer, a monitoring and control CPU, and a monitoring and control circuit; wherein, the sensors comprise a flow sensor, a temperature sensor, a pressure sensor, and a acoustic emission sensor, the sensors are connected in shunt and operate separately from each other without any interference, and they are connected via their interfaces to corresponding interfaces of the monitoring and control module, and have functions such as monitoring signal conversion, data acquisition triggering, periodical data acquisition, data analysis and control.

The flow measurement module comprises a gas flow hole, and a gas circuit switch and a flow sensor that are installed in the gas flow hole.

At least 2 pressure sensors, 2 gas flow holes, and 2 temperature sensors are provided respectively, 1 acoustic wave sensor and 1 electromagnetic radiation sensor are provided, and those components are evenly distributed on the circumference of the compartment.

A measurement method for the above-mentioned measurement-while-drilling device for the coal seam outburst risk, carrying out automatic measurement while drilling for the gas parameters, lithology and coal seam information, automatically monitoring the gas pressure, temperature, flow, coal mass wave velocity, electromagnetic radiation and acoustic wave signals and their changes near the bottom of the borehole in real time with a multi-parameter measurement-while-drilling device during drilling in the coal seam, and drill bit replacement during drilling stop, analyzing and calculating the initial desorption gas amount in the coal seam, gas pressure in the coal seam, gas content, lithology and strength of the medium, and stress in the coal mass at the measuring points, and analyzing and judging the coal seam outburst risk; the specific steps are as follows:

a. installing the drill bit on the front end of the compartment and installing the first drill pipe on the rear end of the compartment, and connecting the first drill pipe to the measurement-while-drilling inclinometer that can measure and log the position of the drill bit before the drilling in the coal seam is commenced; switching on the power supply and driving the drill bit into the borehole; logging water flow $Q_{si}$, pressure $P_i$, temperature $T_i$, electromagnetic radiation $E_i$, and acoustic wave signal $A_i$ in real time after the monitoring acoustic wave signal recognizes that the drilling is started;

b. keeping the main water circuit switch on the compartment in ON state, water flows out from the drill bit to carry out drilling and cuttings discharging normally during normal drilling; controlling the actions of the borehole sealing module with the monitoring and control CPU; switching off the main water circuit switch and switching on the borehole sealing rubber balloon water circuit switch so that the high pressure water enters into the borehole sealing rubber balloons after monitoring an acoustic wave signal recognizing the drilling stop and the stop of the drill bit withdrawal, wherein, when the water pressure becomes stable and there is no flow, it indicates that the borehole has been sealed by the balloons; then, stopping the water supply, switching off the borehole sealing rubber balloon water circuit switch to seal the pressure chamber at the bottom of the borehole, so that gas gushes from the coal wall of the borehole and the pressure P in the pressure chamber at the bottom of the borehole is increased continuously; at the same time, testing the wave velocity in the coal mass automatically by generating vibration wave signals with the vibration source, receiving the vibration wave signals with the vibration pickup, and calculating and logging the wave velocity $V_i$ in the coal mass in real time under the control of the monitoring and control CPU; replacing and adding the drill pipes at the drilling machine during this time; completing the pressure measurement within specified time, switching on the gas circuit switch, and measuring and logging the gas flow $Q_{wi}$ in real time; stopping logging the gas flow $Q_{wi}$ and switching off the gas circuit switch at the end of the flow testing or when the flow is lower than a preset value; switching on the borehole sealing rubber balloon water circuit switch, so that the borehole sealing rubber balloons contract and discharge water automatically; feeding water and continuing the drilling after the balloons contract to a proper position;

c. stopping the drilling when a design position is reached; stopping the acquisition and monitoring of the signals, after the gas flow testing is finished, and the acoustic wave sensor receives no drilling signal for a long time; obtaining the indicator parameters or waveform data, including temperature, pressure, water flow, gas flow, coal mass wave velocity, electromagnetic radiation, and acoustic wave, at different times with the measurement-while-drilling device; calculating and ascertaining the initial desorption gas amount in the coal seam, gas content in the coal seam, and gas pressure in the coal seam at different times at different positions with the monitoring and control device, according to the gas pressure and pressure change, gas gushing velocity, temperature and temperature change, etc. in the pressure chamber during the time the drilling is stopped; ascertaining the stress in the coal mass at the measuring point, according to the wave velocity and the electromagnetic radiation signal; ascertaining the lithology and hardness of the medium according to the wave velocity and features of acoustic wave signals; ascertaining the coal seam outburst risk according to the stress in the coal mass, gas content in the coal seam, gas pressure in the coal seam, and temperature;

d. withdrawing the drill pipe, removing the measurement-while-drilling device, and carrying out data communication; after the communication, ascertaining the initial desorption gas amount in the coal seam, gas pressure in the coal seam, gas content in the coal seam, lithology of the medium, wave velocity in the coal mass, stress in the coal mass, and coal seam outburst risk in the borehole at different positions in a computer with reference to the position data from the measurement-while-drilling inclinometer;

e. repeating the steps a-d for testing for the next borehole.

The drill pipe is turned by 1-2 turns at a low speed during the time the high pressure water enters into the borehole sealing rubber balloons, for better sealing.

The power supply unit is recharged or the power supply module is replaced before the testing for the next borehole is commenced.

Beneficial Effects with the technical scheme described above, the device and method provided in the present invention can test gas and coal seam parameters and outburst risk on the spot in real time while drilling without sampling, and thereby avoid sampling difficulties and test errors incurred by the sampling process; the device and method realize multi-parameter measurement-while-drilling for coal seam outburst risk on the spot in real time, and solve the problems that the coal seam outburst risk testing points, testing data, and testing indicators are inadequate, the testing duration is too long, and the testing process is too complex, etc. The method is simple and convenient to use, can attain a good effect, and has extensive practicability in the technical field.

In the figures: 1—drill bit; 2—gas flow hole; 3—flow sensor; 4—gas circuit switch; 5—vibration source; 6—vibration pickup; 7—wear plate; 8—borehole sealing rubber balloon water circuit switch; 9—communication interface; 10—electric charging interface; 11—power supply compartment; 12—monitoring and control module; 13—threading hole; 14—borehole sealing rubber balloon; 15—main water circuit switch; 16—temperature sensor; 17—pressure sensor; 18—acoustic wave sensor; 19—electromagnetic sensor; 20—compartment; 21—pressure chamber; 22—borehole; 23—first drill pipe; 24—measurement-while-drilling inclinometer.

Note: the gas flow hole 2 refers to a hole that the components 3 and 4 pass through.

EMBODIMENTS

Hereunder the present invention will be further detailed in embodiments with reference to the accompanying drawings.

Figure 1:
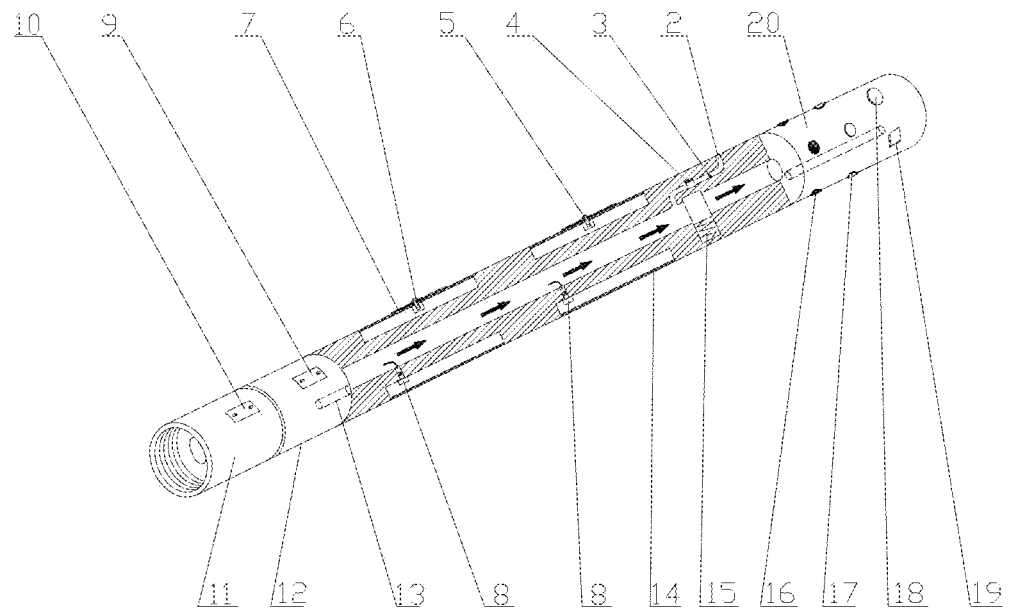
FIG. 1 is a schematic diagram illustrating the device in the present invention.

As shown in FIG. 1, the measurement-while-drilling device for assessing the coal seam outburst risk provided in the present invention mainly comprises a compartment 20, a pressure sensor 17, a temperature sensor 16, a wave velocity measurement module including a vibration source 5 and a vibration pickup 6, an electromagnetic sensor 19, an acoustic wave sensor 18, a borehole sealing module, a flow measurement module, a communication interface 9, a monitoring and control module 12, and a power supply compartment 11 that has an electric charging interface and can be removed and mounted quickly, the power supply compartment 11 supplies power to the monitoring and control module 12 and the power utilization modules or sensors connected to the monitoring and control module; the compartment 20 is a rod body that has a variety of sensors and modules fixed thereon, is hollow and has a water flow hole and a threading hole, with two ends connected with a drill bit 1 and a measurement-while-drilling inclinometer 24 and a first drill pipe 23 respectively in a sealed manner; the pressure sensor 17, the temperature sensor 16, the flow measurement module, the wave velocity measurement module, the electromagnetic sensor 19, the acoustic wave sensor 18, the power supply compartment 11, and communication interface 9 are connected to corresponding interfaces of the monitoring and control module respectively.

Figure 2:
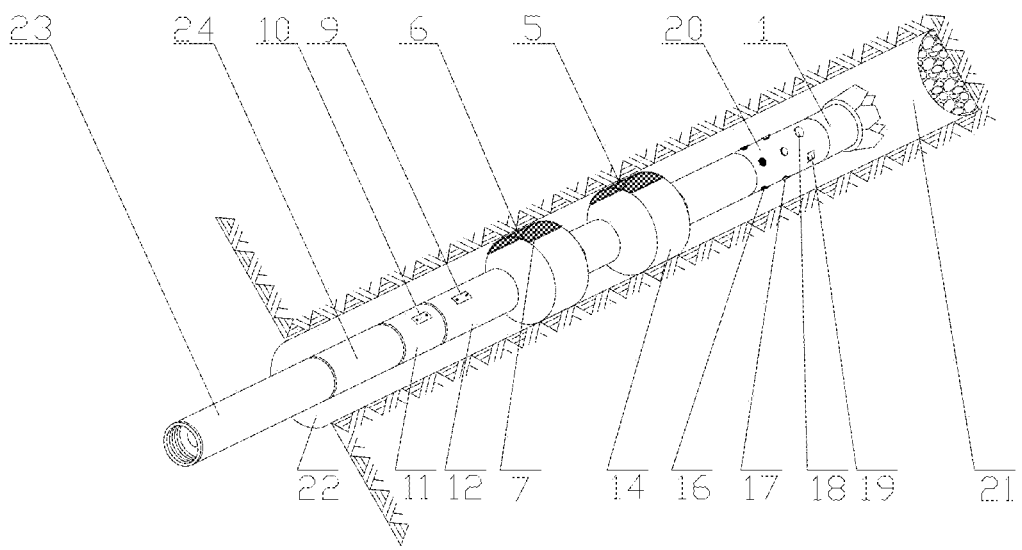
FIG. 2 is a field layout diagram of the device in the present invention.

The borehole sealing module comprises two borehole sealing rubber balloons 14 wrapped on the rims of the compartment 20, a main water circuit switch 15 and a borehole sealing rubber balloon water circuit switch 8 that are mounted on the front end of a hollow water pipe and attain a cut-off effect during borehole sealing; the vibration source 5 of the wave velocity measurement module is mounted on one of the two borehole sealing rubber balloons 14 and emits vibration waves, the vibration pickup 6 is mounted on the other of the borehole sealing rubber balloons 14 and receives vibration waves, the wave velocity in the coal mass at the measuring point can be calculated from the distance and signal time difference between the vibration source 5 and the vibration pickup 6, as shown in FIG. 2.

The monitoring and control module 12 comprises a variety of sensors and module interfaces, a data storage unit, a timer, a monitoring and control CPU, and a monitoring and control circuit; wherein, the sensors comprise a HD-LUGB flow sensor, a GWD90 temperature sensor, a GZY25W pressure sensor, and a GS18 acoustic emission sensor, the sensors are connected in shunt and operate separately from each other without any interference, and they are connected via their interfaces to corresponding interfaces of the monitoring and control module, and have functions such as monitoring signal conversion, data acquisition triggering, periodical data acquisition, data analysis and control.

The flow measurement module comprises a gas flow hole 2, and a gas circuit switch 4 and a flow sensor 3 that are installed in the gas flow hole.

At least 2 pressure sensors 17, 2 gas flow holes 2, and 2 temperature sensors 16 are provided respectively, 1 acoustic wave sensor 18 and 1 electromagnetic radiation sensor 19 are provided, and those components are evenly distributed on the circumference of the compartment 20. The model of pressure sensors is; the model of temperature sensors is.

A measurement method for the above-mentioned measurement-while-drilling device for assessing the coal seam outburst risk, automatically carrying out measurement while drilling for the gas parameters, lithology and coal seam information, automatically monitoring the gas pressure, temperature, flow, coal mass wave velocity, electromagnetic radiation and acoustic wave signals and their changes near the bottom of the borehole in real time with a multi-parameter measurement-while-drilling device during drilling in the coal seam, drilling stop, and drill bit replacement, analyzing and calculating the initial desorption gas amount in the coal seam, gas pressure in the coal seam, gas content, lithology and strength of the medium, and stress in the coal mass, at the measuring points, and analyzing and judging the coal seam outburst risk; the specific steps are as follows:

a. installing the drill bit 1 on the front end of the compartment 20, installing the first drill pipe 23 on the rear end of the compartment 20, and connecting the first drill pipe 23 to a measurement-while-drilling inclinometer 24 that can measure and log the position of the drill bit 1 before the drilling in the coal seam is commenced; switching on the power supply and driving the drill bit 1 into the borehole 22; logging water flow $Q_{si}$, pressure $P_i$, temperature $T_i$, electromagnetic radiation $E_i$, and acoustic wave signal $A_i$ in real time after the acoustic wave sensor 18 monitors that acoustic wave signal recognizes that the drilling is started; in the process of use of the measurement-while-drilling device, the power supply compartment 11 supplies power to the monitoring and control module and the power utilization modules or sensors connected to the monitoring and control module;

b. keeping the main water circuit switch 15 on the compartment 20 in ON state, water flows out from the drill bit to carry out drilling and cuttings discharging normally during normal drilling; controlling the actions of the borehole sealing module with the monitoring and control CPU; switching off the main water circuit switch 15 and switching on the borehole sealing rubber balloon water circuit switch 8 so that the high pressure water enters into the borehole sealing rubber balloons 14 after an acoustic wave signal recognizes that drilling is stopped and drill bit withdrawal is completed, turning the drill pipe by 1-2 turns at a low speed for better sealing, when the water pressure becomes stable and there is no flow, it indicates that the borehole has been sealed by the balloons 14; then, stopping the water supply, switching off the borehole sealing rubber balloon water circuit switch 8 to seal the pressure chamber 21 at the bottom of the borehole, so that gas gushes from the coal wall of the borehole 22 and the pressure Pi in the pressure chamber 21 at the bottom of the borehole is increased continuously; at the same time, testing the wave velocity in the coal mass automatically by generating vibration wave signals with the vibration source 5, receiving the vibration wave signals with the vibration pickup 6, and calculating and logging the wave velocity $V_i$ in the coal mass in real time under the control of the monitoring and control CPU; replacing and adding the drill pipes 23 at the drilling machine during this time; completing the pressure measurement within specified time, switching on the gas circuit switch 4, and measuring and logging the gas flow $Q_{wi}$ in real time; stopping logging the gas flow $Q_{wi}$ and switching off the gas circuit switch 4 at the end of the flow testing or when the flow is lower than a preset value; switching on the borehole sealing rubber balloon water circuit switch 8, so that the borehole sealing rubber balloons 14 contract and discharge water automatically; feeding water and continuing the drilling after the balloons 14 contract to a proper position; turning the drill pipe by 1-2 turns at a low speed during the high pressure water enters into the borehole sealing rubber balloons 14 for better sealing.

c. stopping the drilling when a design position is reached; stopping the acquisition and monitoring of the signals, after the gas flow testing is finished, and when the acoustic wave sensor 18 receives no drilling signal for a long time;

obtaining the indicator parameters or waveform data, including temperature, pressure, water flow, gas flow, coal mass wave velocity, electromagnetic radiation, and acoustic wave, at different times with the measurement-while-drilling device; calculating and ascertaining the initial desorption gas amount in the coal seam, gas content in the coal seam, and gas pressure in the coal seam at different times at different positions with the monitoring and control device, according to the gas pressure and pressure change, gas gushing velocity, temperature and temperature change, etc. in the pressure chamber during the time the drilling is stopped; ascertaining the stress in the coal mass at the measuring point, according to the wave velocity and the electromagnetic radiation signal; ascertaining the lithology and hardness of the medium according to the wave velocity and features of acoustic wave signals; ascertaining the coal seam outburst risk according to the stress in the coal mass, gas content in the coal seam, gas pressure in the coal seam, and temperature;

d. withdrawing the drill pipe, removing the measurement-while-drilling device, and carrying out data communication; after the communication, ascertaining the initial desorption gas amount in the coal seam, gas pressure in the coal seam, gas content in the coal seam, lithology of the medium, wave velocity in the coal mass, stress in the coal mass, and coal seam outburst risk in the borehole 22 at different positions in a computer with reference to the position data from the measurement-while-drilling inclinometer 24;

e. repeating the steps a-d for testing for the next borehole; recharging the power supply unit or replacing the power supply module, before the testing for the next borehole is commenced.

The invention claimed is:

1. A measurement-while-drilling device for a coal seam outburst risk, comprising a compartment (20), a pressure sensor (17), a temperature sensor (16), a wave velocity measurement module including a vibration source (5) and a vibration pickup (6), an electromagnetic sensor (19), an acoustic wave sensor (18), a borehole sealing module, a flow measurement module, a communication interface (9), a monitoring and control module (12), and a power supply compartment (11) that has an electric charging interface and can be removed and mounted quickly, the power supply compartment (11) supplies power to the monitoring and control module (12) and the power utilization modules or sensors connected to the monitoring and control module; the compartment (20) is a rod body that has a variety of sensors and modules fixed thereon, is hollow and has a water flow hole and a threading hole, with two ends connected with a drill bit (1) and a measurement-while-drilling inclinometer (24) and a first drill pipe (23) respectively in a sealed manner; the pressure sensor (17), the temperature sensor (16), the flow measurement module, the wave velocity measurement module, the electromagnetic sensor (19), the acoustic wave sensor (18), the power supply compartment (11), and communication interface (9) are connected to corresponding interfaces of the monitoring and control module respectively;

the borehole sealing module comprises two borehole sealing rubber balloons (14) wrapped on rims of the compartment (20), a main water circuit switch (15) and a borehole sealing rubber balloon water circuit switch (8) that are mounted on a front end of a hollow water pipe and attain a cut-off effect during borehole sealing; the vibration source (5) of the wave velocity measurement module is mounted on one of the two borehole sealing rubber balloons (14) and emits vibration waves, the vibration pickup (6) is mounted on the other of the borehole sealing rubber balloons (14) and receives vibration waves, a wave velocity in a coal mass at a measuring point can be calculated from a distance and signal time difference between the vibration source (5) and the vibration pickup (6);

the monitoring and control module (12) comprises a variety of sensors and module interfaces, a data storage unit, a timer, a monitoring and control CPU, and a monitoring and control circuit; wherein, the sensors comprise a flow sensor, a temperature sensor, a pressure sensor, and a acoustic emission sensor, the sensors are connected in shunt and operate separately from each other without any interference, and they are connected via their interfaces to corresponding interfaces of the monitoring and control module, and have functions of monitoring signal conversion, data acquisition triggering, periodical data acquisition, data analysis and control; and the flow measurement module comprises a gas flow hole (2), and a gas circuit switch (4) and a flow sensor (3) that are installed in the gas flow hole.

2. The measurement-while-drilling device for the coal seam outburst risk according to claim 1, wherein: at least 2 pressure sensors (17), 2 gas flow holes (2), and 2 temperature sensors (16) are provided respectively, 1 acoustic wave sensor (18) and 1 electromagnetic radiation sensor (19) are provided, and those components are evenly distributed on the circumference of the compartment (20).

3. A measurement method for the measurement-while-drilling device for the coal seam outburst risk according to claim 1, wherein: automatically carrying out measurement while drilling for gas parameters, lithology and coal seam information, automatically monitoring gas pressure, temperature, flow, coal mass wave velocity, electromagnetic radiation and acoustic wave signals and their changes near a bottom of the borehole in real time with a multi-parameter measurement-while-drilling device during drilling in the coal seam, drilling stop, and drill bit replacement, analyzing and calculating an initial desorption gas amount in the coal seam, gas pressure in the coal seam, gas content, lithology and strength of a medium, and stress in the coal mass, at measuring points, and analyzing and judging the coal seam outburst risk; specific steps are as follows:
  a. installing the drill bit (1) on a front end of the compartment (20), installing the first drill pipe (23) on a rear end of the compartment (20), and connecting the first drill pipe (23) to the measurement-while-drilling inclinometer (24) that can measure and log a position of the drill bit (1) before the drilling in the coal seam is commenced; switching on the power supply and driving the drill bit (1) into the borehole (22); logging water flow Qsi, pressure Pi, temperature Ti, electromagnetic radiation Ei, and acoustic wave signal Ai in real time after a monitoring acoustic wave signal recognizes that the drilling is started;
  b. keeping the main water circuit switch (15) on the compartment (20) in ON state, water flows out from the drill bit to carry out drilling and cuttings discharging normally during normal drilling; controlling actions of the borehole sealing module with the monitoring and control CPU; switching off the main water circuit switch (15) and switching on the borehole sealing rubber balloon water circuit switch (8) so that high pressure water enters into the borehole sealing rubber balloons (14) after monitoring that an acoustic wave signal recognizes that drilling is stopped, and drill bit withdrawal is completed, wherein, when water pressure becomes stable and there is no flow, it indicates that the borehole has been sealed by the balloons (14); then, stopping the water supply, switching off the borehole sealing rubber balloon water circuit switch (8) to seal a pressure chamber (21) at the bottom of the borehole, so that gas gushes from a coal wall of the borehole (22) and the pressure Pi in the pressure chamber (21) at the bottom of the borehole is increased continuously; at a same time, testing the wave velocity in the coal mass automatically by generating vibration wave signals with the vibration source (5), receiving the vibration wave signals with the vibration pickup (6), and calculating and logging the wave velocity Vi in the coal mass in real time under control of the monitoring and control CPU; replacing and adding drill pipes at a drilling machine during this time; completing a pressure measurement within specified time, switching on the gas circuit switch (4), and measuring and logging a gas flow Qwi in real time; stopping logging the gas flow Qwi and switching off the gas circuit switch (4) at an end of the flow testing or when the flow is lower than a preset value; switching on the borehole sealing rubber balloon water circuit switch (8), so that the borehole sealing rubber balloons (14) contract and discharge water automatically; feeding water and continuing the drilling after the borehole sealing rubber balloons (14) contract to a proper position;
  c. stopping the drilling when a design position is reached; stopping the acquisition and monitoring of the signals, after the gas flow testing is finished, and when the acoustic wave sensor (18) receives no drilling signal for a long time;
    obtaining the indicator parameters or waveform data, including temperature, pressure, water flow, gas flow, coal mass wave velocity, electromagnetic radiation, and acoustic wave, at different times with the measurement-while-drilling device; calculating and ascertaining an initial desorption gas amount in the coal seam, gas content in the coal seam, and gas pressure in the coal seam at different times at different positions with the monitoring and control module, according to the gas pressure and pressure change, gas gushing velocity, temperature and temperature change, etc. in a pressure chamber during the time the drilling is stopped; ascertaining the stress in the coal mass at the measuring point, according to the wave velocity and the electromagnetic radiation signal; ascertaining a lithology and hardness of the medium according to the wave velocity and features of acoustic wave signals; ascertaining the coal seam outburst risk according to the stress in the coal mass, gas content in the coal seam, gas pressure in the coal seam, and temperature;
  d. withdrawing the drill pipe, removing the measurement-while-drilling device, and carrying out data communication; after the communication, ascertaining the initial desorption gas amount in the coal seam, gas pressure in the coal seam, gas content in the coal seam, lithology of the medium, wave velocity in the coal mass, stress in the coal mass, and coal seam outburst risk in the borehole (22) at different positions in a computer with reference to position data from the measurement-while-drilling inclinometer (24);
  e. repeating the steps a-d for testing for a next borehole.

4. The measurement method according to claim 3, wherein: the drill pipe is turned by 1-2 turns at a low speed during a time the high pressure water enters into the borehole sealing rubber balloons (14) for better sealing.

5. The measurement method according to claim 3, wherein: a power supply unit is recharged or the power supply module is replaced before the testing for the next borehole is commenced.

* * * * *